United States Patent Office 3,530,186
Patented Sept. 22, 1970

3,530,186
PROCESS FOR THE PREPARATION OF CATECHOL AND 2,2' - DIHYDROXYDIPHENYLAMINE OR LOWER ALKYL ETHERS THEREOF
Nicholas P. Greco, Pittsburgh, Pa., assignor to Koppers Company, Inc., a corporation of Delaware
No Drawing. Filed Nov. 14, 1966, Ser. No. 593,712
Int. Cl. C07c 91/42, 39/02
U.S. Cl. 260—571
4 Claims

ABSTRACT OF THE DISCLOSURE

Catechol and 2,2'-dihydroxydiphenylamine or lower alkyl ethers thereof are formed in high yields and high purity in a one-step process by the phosphoric acid hydrolysis of ortho-aminophenol or lower alkyl ethers of ortho-aminophenol at temperatures of 180–250° C. and superatmospheric pressure.

---

Catechol is an important inorganic chemical used in the preparation of various dyes and medicinal compounds. Numerous other uses for the compound are found in photographic processes, in inks, and specifically in the production of antioxidants for rubber, lubricating oils, and various polymeric materials.

The only known publication relating to the preparation of catechol by an acid hydrolysis of ortho-aminophenol is by J. Meyer, Ber. 30, 2568 (1897). The Meyer article states that catechol can be produced, in low yields and low conversion of starting material by an acid hydrolysis which used either hydrochloric acid, sulfuric acid, or stannous chloride. The attempts of Meyer resulted in the production of large amounts of resinous material in addition to the low yields of catechol. No details are given by Meyer as to the difficulties in the separation of the low yield of catechol from the resulting resinous mass, but presumably such a separation would be very difficult. The discouraging results reported by Meyer, the low yields and extensive resin formation have led to the use of more sophisticated methods of preparing catechol. For example, a present commercial process for the production of catechol uses a caustic fusion or ortho-chlorophenol which is a costly and time-consuming reaction.

I have discovered that surprisingly the use of a specific mineral acid for the hydrolysis of ortho-aminophenol or its lower alkyl ethers results in the production of high yields of catechol and 2,2'-dihydroxy or di lower alkoxy diphenylamines, the high yield of product being in relatively pure form. My process accomplishes the acid hydrolysis in a simple one-step reaction and solves the problem of extensive resin formation.

In accordance with my invention, catechol is produced by a process which comprises contacting an ortho-aminophenolic compound with phosphoric acid, the amount of phosphoric acid being in excess of one equivalent of hydrolytic hydrogen per mole of ortho-aminophenol compound. The phosphoric acid is used as a 10–40% aqueous solution and is maintained in contact with the ortho-aminophenolic compound at a temperature of 180–250° C. and at superatmospheric pressure for a period of time which is sufficient to convert the ortho-aminophenolic compound to catechol. The catechol produced is then readily separated from the reaction mixture.

The ortho-aminophenolic compounds suitable for use in my invention are ortho-aminophenol and the lower alkyl ethers of ortho-aminophenol. The ortho-aminophenol can be prepared by any conventional process, but of particular significance is the preparation of ortho-aminophenol from ortho-chloronitrobenzene, a relatively inexpensive precursor. The useful lower alkyl ethers of ortho-aminophenol are for example, the methyl ether, ortho-anisidine, and the ethyl ether, ortho-phenetidine. For the purpose of simplicity, the preferred starting material, ortho-aminophenol will be used in the following process description.

The phosphoric acid is used in the form of an aqueous solution which contains from about 10–40% by weight of phosphoric acid. Lower concentrations of phosphoric acid result in incomplete hydrolysis of the ortho-aminophenol and cause problems in the separation of the catechol from the unreacted starting material. Higher concentrations of phosphoric acid in excess of about 40% may be employed in my process, but the increase of such concentration can result in esterification of the starting material or other side reactions and decrease the yield of the desired catechol.

I have found that phosphoric acid is the only hydrolyzing agent capable of producing significant quantities of catechol from an ortho-aminophenolic compound without producing large quantities of resinous material and other undesirable by-products. The unique effect of phosphoric acid in my hydrolysis system can be attributed to the effect of the hydrolysis product that it forms in situ during the hydrolysis reaction. Upon hydrolysis of the ortho-aminophenol compound, there are produced ammonium phosphate salts, from the reaction of the phosphoric acid and the ammonia formed during the hydrolysis, such as ammonium dihydrogen phosphate or other hydrogen phosphate ammonium salts which are soluble in the aqueous hydrolysis medium. It is the presence of these ammonium phosphate salts which can buffer the reaction mixture and result in the inhibition of resin formation and the prevention of the undesirable degradation of the catechol product. This unique buffering effect of the ammonium phosphate salts, formed in situ during the hydrolysis reaction, is not present when other mineral acids are used in attempting such a hydrolysis.

Other mineral acids have been found to introduce side reactions and subject any catechol produced to degradation. Thus, the use of other mineral acids result in the production of large amounts of resinous material and in the degradation of any catechol produced before sufficient conversion of the ortho-phenolic compound can be achieved. For example, the use of sulfuric acid at the conditions employed in my process results in an oxidation reaction and in the formation of products other than the desired catechol. Thus, the use of other mineral acids resulting in large quantities of resinous material causes problems in the separation of any catechol which might be produced and in the corrosion or decontamination of the reactor with such resinous matter.

In addition to use of ortho-phosphoric acid, other phosphoric acids, such as pyrophosphoric or meta-phosphoric acid may be used. These acids, however are known to hydrolyze to ortho-phosphoric acid in aqueous solution such as that used in my process.

The amount of phosphoric acid used is an important factor in the success of the present process. A minimum amount of phosphoric acid corresponding to at least one equivalent of hydrolytic hydrogen per mole of ortho-aminophenol is necessary. I have found that only the first hydrogen atom of the phosphoric acid can act as an effective hydrolytic hydrogen in the hydrolysis of ortho-aminophenol. The term hydrolytic hydrogen as used herein is defined as the primary hydrogen of the phosphoric acid, that is the most acid hydrogen. It is, therefore, necessary that at least one mole of phosphoric acid, containing one equivalent of hydrolytic hydrogen, per mole of ortho-aminophenol be present in the reaction mixture. It is significant that the fact that only the first hydrogen atom can act as a suitable hydrolytic hydrogen results in the formation, in situ, of hydrogen ammonium phosphate salts which can act as a buffering agent for the catechol produced and for the prevention of degradation of either the starting material or the catechol. This unique buffering effect which is caused by the formation of the hydrogen ammonium salts from the phosphoric acid employed for the actual hydrolysis of the ortho-aminophenol is not present in other acid hydrolysis processes.

When the ortho-aminophenol is brought into contact with the aqueous solution of phosphoric acid, containing at least one equivalent of hydrolytic hydrogen per mole of ortho-aminophenol, the reaction mixture is heated to a temperature of about 180–250° C. The use of lower temperatures results in incomplete conversion of the starting material with resulting contamination of any catechol produced. If temperatures in excess of about 250° C. are used, no particular advantage is noted and such temperatures merely necessitate the use of specific alloys or heat resistant metals in the make up of the reaction equipment.

After the hydrolysis has reached the desired temperature range, the system is held at this temperature for about 3–6 hours. The contact time necessary for the conversion of the starting material is, of course, dependent upon the temperature, the higher temperatures necessitating the use of the shorter reaction time. Reaction times in excess of those preferred have found not to cause any significant degradation of the product but are, of course, impractical for economical reasons.

To obtain the desired temperature range while employing an aqueous solution of phosphoric acid in contact with the ortho-aminophenol, it is necessary to use superatmospheric pressure. It is not necessary to increase the pressure, but merely to enable the sealed reaction equipment to withstand the vapor pressure of the reaction mixture at the desirable temperature range. It is, of course, feasible to employ pressures in excess of the vapor pressure of the reaction mixture between 180 and 250° C., but no advantage is seen in the use of such conditions. The pressure equipment employed in my process should be such that will withstand the corrosive nature of the concentrations of phosphoric acid employed at the reaction temperature.

The only solvent used in my process is the water which makes up the aqueous solution of phosphoric acid. It is unnecessary to use any further solvents and a considerable economic advantage is afforded by the use of water alone as the solvent medium for the reaction process.

An important aspect of my invention is the easy separability of the produced catechol and the 2,2'-dihydroxydiphenylamine or lower alkyl ether thereof from the reaction mixture. Since the reaction occurs without any significant preparation of resinous material, it is only necessary to precipitate the 2,2'-dihydroxydiphenylamine or lower alkyl ether thereof from the reaction mixture by cooling the aqueous solution. The precipitate can then be readily separated from the aqueous system by filtration, centrifuging, or the like.

The solubility of catechol in water is such that the aqueous reaction mixture retains the catechol in solution while the co-product precipitates from the solution when cooled and enables ready separation. Following cooling and filtering of the reaction mixture, the catechol is easily extracted from the aqueous solution by the use of ether or other suitable organic solvents which when evaporated leave the catechol produced in a relatively pure form. The catechol produced according to the present process is of high purity having a melting point of about 104–105° C., the literature melting point for catechol being 105° C.

My invention is further illustrated by the following examples:

EXAMPLE I

To a two liter capacity shaker autoclave containing a glass liner, there was charged 25 g. (0.23 mole) of ortho-aminophenol, 225 milliliters of water and 85 g. of 85% ortho-phosphoric acid (0.73 mole). The autoclave was purged with nitrogen gas and then heated to 230° C. during 1.5 hours. The pressure in the autoclave was 1,000 p.s.i. The reaction mixture was held at this temperature and pressure for a period of 6 hours, then cooled to room temperature. On cooling a precipitate formed which was filtered. The aqueous filtrate was extracted with ether, the ether extract dried and concentrated by distillation to give 15.0 grams of catechol, corresponding to a 60% yield based on starting ortho-aminophenol. The precipitate, filtered after cooling of reaction mixture, was dried to give 9.5 grams of 2,2'-dihydroxydiphenylamine (40%). The aqueous filtrate, following ether extraction of the organic material was analyzed and shown to contain an inorganic ammonium salt.

EXAMPLE II

There was charged to a 2.2 liter shaking autoclave containing a glass liner 25 grams (0.23 mole) of ortho-aminophenol, 100 grams of water and 85 grams of 85% ortho-phosphoric acid (0.73 mole). The autoclave was purged with nitrogen and then heated to 230–240° C. for a period of 6 hours. The reaction mixture was cooled, filtered to remove the precipitate which formed, and extracted with ether. The ether extract upon drying and distillation of the ether gave 12.6 grams (50%) of catechol. The precipitate upon drying gave a 48% yield of 2,2'-dihydroxydiphenylamine.

EXAMPLE III

A sulfuric acid hydrolysis of ortho-aminophenol was attempted. To the shaker autoclave with glass liner described in previous examples, there was charged 25 grams of ortho-aminophenol (0.23 mole), 250 grams of water and 85 grams (0.87 mole) of sulfuric acid. The acid concentration in the resulting aqueous solution was about 23%. The reaction mixture was heated in the sealed autoclave to a temperature of 200° C. and held at that temperature for 8 hours. The pressure within the autoclave was about 280 p.s.i. The resulting product was a resinous mass with no catechol being present.

EXAMPLE IV

An attempt to hydrolyze ortho-aminophenol with a lesser amount of sulfuric acid than employed in Example III was made. The reactants were 28 milliliters of 18 N $H_2SO_4$, 25 grams of ortho-aminophenol and 298 grams of water. The reactants were heated in a sealed autoclave at 200–230° C. for one hour (1,000 p.s.i.). A large quantity (20 grams) of resin was produced, with only 4 grams (16%) of very crude catechol being found in the product. There was a strong odor of sulfur dioxide present indicating oxidation rather than hydrolysis was occurring.

EXAMPLE V

There was charged to an autoclave, 25 grams of ortho-aminophenol (0.23 mole), 200 milliliters of water and 85 grams of ortho-phosphoric acid (0.73 mole). The autoclave was purged with nitrogen and heated at 165–170° C. for a period of 14.5 hours. The reaction mass was cooled, filtered to remove precipitate and extracted with ether. The ether extracts, upon distillation gave no catechol. The precipitate, from filtering of the cooled reaction mass, was dried and weighed to give 2.35 grams of 2,2'-dihydroxydiphenylamine. Thus, the effect of temperature upon conversion of the starting material is illustrated.

EXAMPLE VI

An attempt to hydrolyze ortho-aminophenol with hydrochloric acid was made. Ortho-aminophenol (25 g. 0.23 mole) was heated and shaken in an autoclave at 200° C. with an aqueous solution of hydrochoric acid (0.75 mole). The concentration of HCl in the reaction mixture was 30% by weight. The resulting product was a tarry mass from which only about a 12% yield of crude catechol could be recovered.

EXAMPLE VII

Attempted hydrolysis or ortho-aminophenol in vapor phase, by passage over alumina-silica catalyst at 250° C. failed to give any of the desired product, catechol. Decomposition occurred rendering the product unidentifiable. No catechol could be extracted therefrom.

EXAMPLE VIII

In this experiment, ortho-anisidine, the methyl ether of ortho-aminophenol was hydrolyzed. To an autoclave, fitted with a glass liner, there was charged 25.0 g. of ortho-anisidine, 225 g. of water and 86 g. of 85% ortho-phosphoric acid. After purging with nitrogen, the reaction mixture was heated and shaken at 230° C. for a period of 3 hours. The reaction mixture was cooled to 25° C. and filtered. The filtrate was extracted with ether and upon distillation of the ether extracts gave 12.0 grams of catechol. The filtered precipitate (10 g.) was analyzed and shown to be 2,2'-dimethoxydiphenylamine.

EXAMPLE IX

An experiment was made, following the procedure of Example VIII, using ortho-phenetidine as starting material. The reaction resulted in the production of quantities comparable to those of Example VIII, of catechol and 2,2'-diethoxydiphenylamine.

I claim:
1. A process for the simultaneous production of catechol and 2,2'-dihydroxydiphenylamine comprising contacting ortho-aminophenol with aqueous ortho-phosphoric acid, said ortho-prosphoric acid being present in an amount between 10–40% by weight based on the weight of the reaction mixture, maintaining said reaction mixture at a temperature of 180–250° C. at superatmospheric pressure for a period of time sufficient to cause formation of catechol and 2,2'-dihydroxydiphenylamine and recovering said catechol and 2,2'-dihydroxydiphenylamine therefrom.

2. Process for the preparation of catechol comprising:
   (a) contacting an ortho-aminophenol compound, selected from the group consisting of ortho-aminophenol and ortho-aminophenol lower alkyl ethers, with aqueous phosphoric acid in an amount of about 10–40% weight, based on the weight of the reaction mixture;
   (b) maintaining said reaction mixture at a temperature of 180–250° C. at superatmospheric pressure for a period of time sufficient to convert said ortho-aminophenolic compound to catechol; and
   (c) recovering said catechol from the reaction mixture.

3. The process of claim 2 wherein said ortho-aminophenolic compound is ortho-aminophenol.

4. The process of claim 2 wherein said ortho-aminophenolic compound is ortho-anisidine.

References Cited

UNITED STATES PATENTS 2,238,320   4/1941   Hardman _____ 260—571 X

OTHER REFERENCES

Meyer, Ber., 30, 2568–2569, (1897).

CHARLES B. PARKER, Primary Examiner

C. F. WARREN, Assistant Examiner

U.S. Cl. X.R.

260—621